United States Patent

Deane

Patent Number: 5,259,486
Date of Patent: Nov. 9, 1993

[54] INTEGRAL CASTED LABRYNTH RING FOR BRAKE DRUM

[75] Inventor: Alastair R. Deane, Novi, Mich.

[73] Assignee: The Budd Company, Troy, Mich.

[21] Appl. No.: 834,586

[22] Filed: Feb. 12, 1992

[51] Int. Cl.⁵ .............................................. F16D 65/10
[52] U.S. Cl. ................................ 188/218 A; 188/218 R
[58] Field of Search ......... 188/218 A, 218 R, 218 XL; 301/6.8, 6.91; 164/99

[56] References Cited

U.S. PATENT DOCUMENTS

| | | | |
|---|---|---|---|
| 1,989,211 | 1/1935 | Norton | 188/218 R |
| 2,109,110 | 2/1938 | Frank | 188/218 R |
| 2,136,447 | 11/1938 | Le Jeune | 164/99 |
| 2,173,591 | 9/1939 | Miller et al. | 188/218 R |
| 2,858,913 | 11/1958 | Afanador | 188/218 R |
| 2,998,870 | 9/1961 | Herman et al. | 188/264 R |
| 3,013,636 | 12/1961 | Dotto et al. | 188/264 CC |
| 3,016,269 | 1/1962 | De Lorean | 301/6 CS |
| 3,035,667 | 5/1967 | Malthaner | 188/218 R |
| 3,147,828 | 9/1964 | Hunsaker | 188/218 R |
| 3,506,478 | 4/1970 | Hudson et al. | 188/218 R |
| 3,630,323 | 12/1971 | Hickle | 188/118 |
| 3,841,448 | 10/1974 | Norton, Jr. | 188/218 R |
| 4,266,638 | 5/1981 | Petersen et al. | 188/218 R |
| 4,858,731 | 8/1989 | Bush | 188/218 R |
| 5,115,891 | 5/1992 | Raitzer et al. | 188/218 R |

FOREIGN PATENT DOCUMENTS

| | | | |
|---|---|---|---|
| 665108 | 6/1963 | Canada | 188/218 R |
| 1217806 | 5/1966 | Fed. Rep. of Germany | 188/218 A |

*Primary Examiner*—Robert J. Oberleitner
*Assistant Examiner*—Alfred Muratori
*Attorney, Agent, or Firm*—Harness, Dickey & Pierce

[57] ABSTRACT

A composite brake drum for motor vehicle applications incorporating an embedded annular ring insert. The annular ring is positioned within a casting cavity to define the surfaces of a labrynth groove at the open rim of the brake drum. The labrynth groove defines a region for a backing plate flange to define a labrynth seal to prevent entry of debris into the brake drum. By defining the labrynth groove using an annular ring inserted within the mold, the post-casting machining requirements are significantly reduced. Moreover, the presence of a steel ring in the rim of the brake drum provides structural benefits. The annular ring further preferably incorporates locating features to assure accurate positioning within the casting mold cavity.

15 Claims, 2 Drawing Sheets

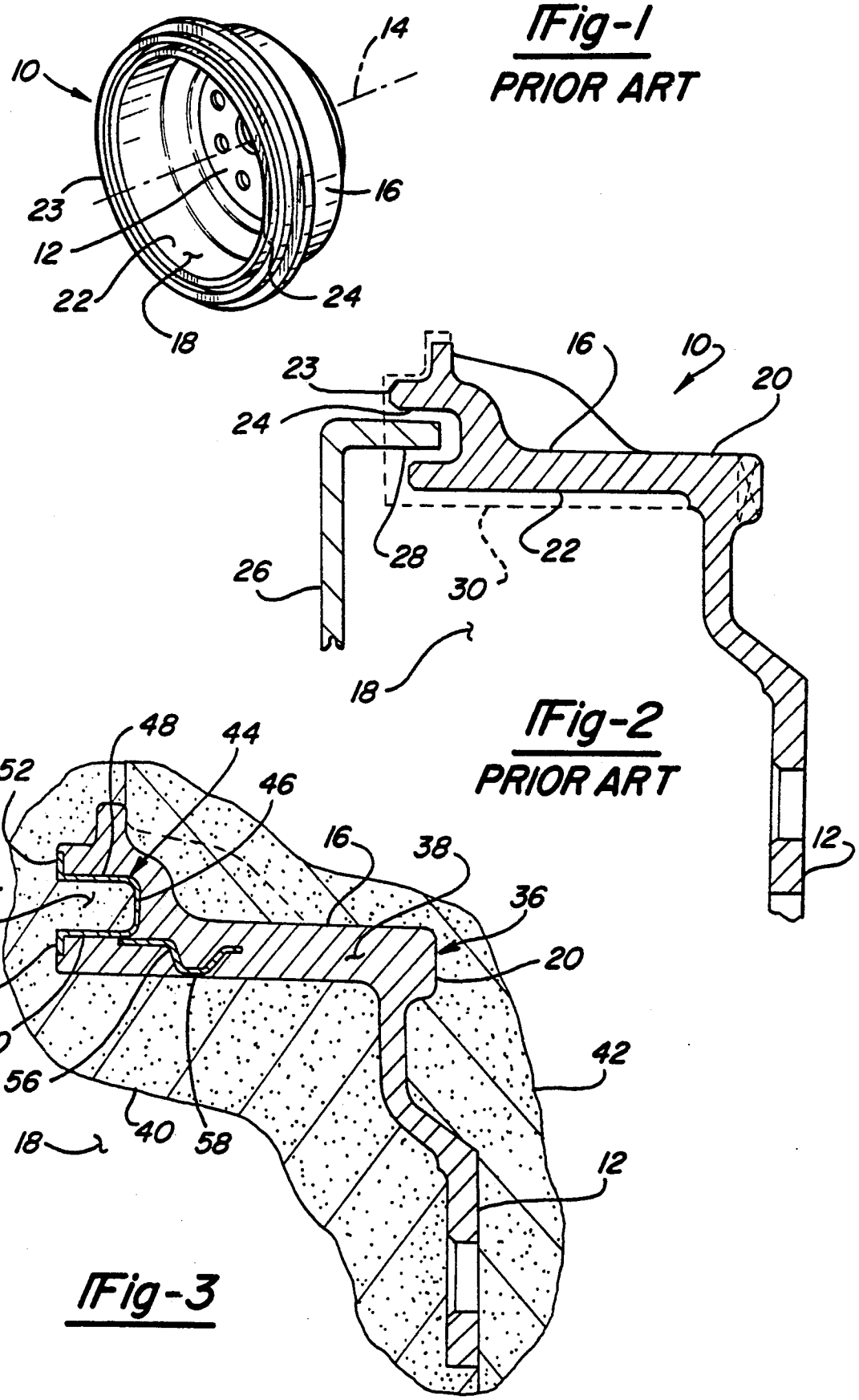

INTEGRAL CASTED LABRYNTH RING FOR BRAKE DRUM

BACKGROUND AND SUMMARY OF THE INVENTION

This invention relates to a motor vehicle brake drum and particularly to one in which a metal ring is cast in place within the drum structure during production to reduce machining requirements after casting.

Motor vehicle brake drums are typically produced by a casting process in which cast iron is poured into green-sand casting molds. By its very nature, such casting processes have limitations in terms of dimensional tolerances and surface finishes which can be achieved in the as-cast part. It is, therefore, generally necessary to machine the brake drum after casting to generate the inside cylindrical braking surface and to form the mounting surfaces of the center section of the brake drum. As a means of reducing outside contaminants from entering the brake drum in use, brake drums typically have a labrynth groove encircling the open rim of the drum. A sheet metal backing plate mounted to the vehicle axle typically includes an up-standing flange which is positioned within the labrynth groove when the brake drum is mounted to the vehicle. Due to the various dimensional stack-ups and part distortion during use, the labrynth groove of the brake drum must be accurately formed. In some applications, it is possible to form the labrynth groove with sufficient accuracy during brake drum casting. However, in some applications, and especially small passenger car brake drums, the labrynth groove must be formed by machining the casting to provide the requisite degree of accuracy. The requirement of machining the groove results in a significant waste in terms of the material which must be removed from the groove. The machining operation is also demanding in terms of process time and tool life.

The brake drum according to this invention is a composite structure which includes a ring which is insert-cast into the brake drum. The ring insert is preferably made from stamped sheet steel and forms three walls of the labrynth groove and is positioned within the casting mold such that the cast iron material surrounds it thus embedding it within the structure. After casting, the hollow inside surface of the ring defines the labrynth groove. The ring insert can be formed with high precision and located within the molding cavity to eliminate or substantially reduce the requirement of post-casting machining of the labrynth groove. The use of the ring insert is further believed to provide a tighter gap control with respect to the drum backing plate. Moreover, the existence of a steel ring insert within the open end of the drum provides enhanced mechanical properties of the composite drum.

In the prior art there are numerous known designs for composite brake drums including that described in U.S. Pat. No. 4,858,731 issued to the assignee of this invention. In that patent, a formed wire reinforcing structure is embedded within the brake drum structure for the purpose of improving mechanical characteristics, and in particular, the fatigue life of the drum. Various other configurations and processes of forming composite brake drums are known. However, the prior art does not disclose providing the annular ring of this invention for the purposes of forming the surfaces of a labrynth ring for the purpose of providing an accurately formed labrynth seal groove. Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view of a typical brake drum of the type used for motor vehicle applications according to the prior art.

FIG. 2 is a cross-sectional view taken through a brake drum and backing plate in accordance with a prior art design illustrating the material which is removed after the casting of the drum to form a labrynth groove and further showing the drum backing plate.

FIG. 3 is a cross-sectional view taken through a composite drum in accordance with this invention shown within the green sand mold after cast iron is poured into the mold cavity.

DETAILED DESCRIPTION OF THE INVENTION

Figure 4:
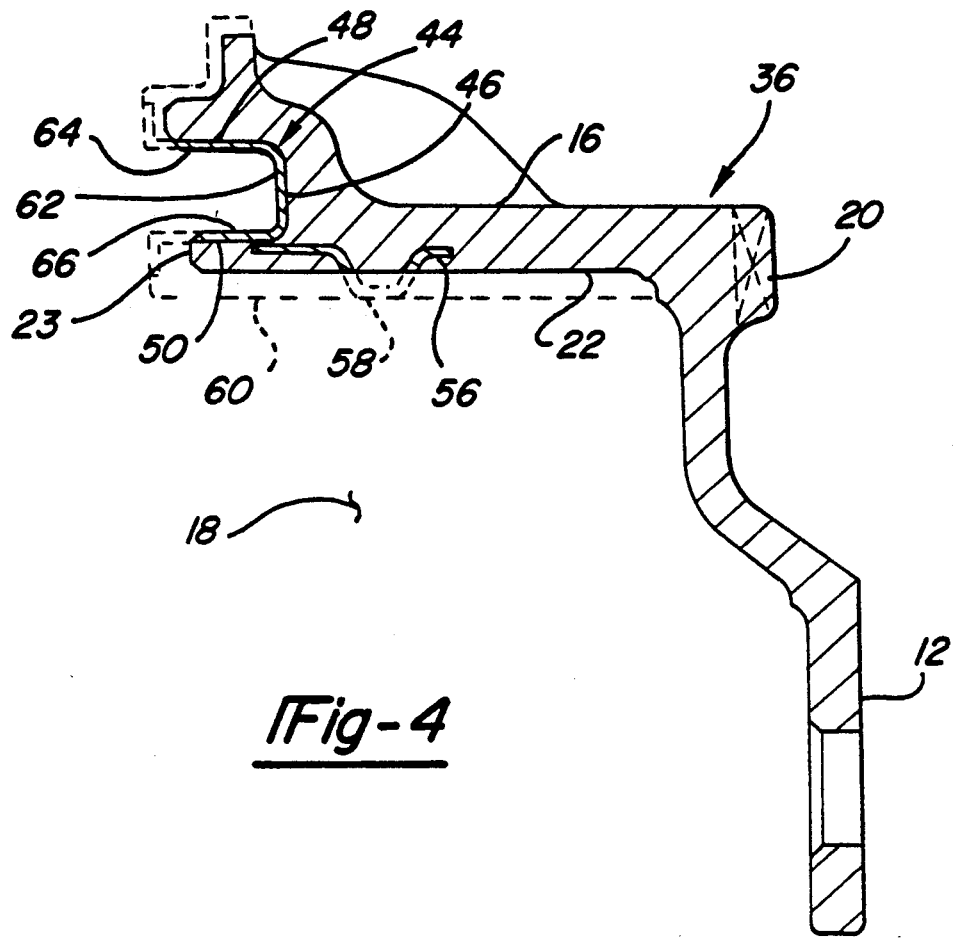
FIG. 4 is a partial cross-sectional view similar to FIG. 2 except showing the drum of this invention removed from the mold cavity and showing the configuration after final machining.

A representative brake drum according to the prior art is shown in FIGS. 1 and 2 and is generally designated there by reference number 10. Brake drum 10 has a mounting disk portion 12 configured to enable the drum to be mounted to a motor vehicle axle hub (not shown) for rotation about an axis of rotation 14. The mounting disk portion 12 merges into a cylindrical side portion 16 thus forming an open end 18 and a closed end 20. The inside cylindrical friction surface 22 of the drum is engaged by expanding brake shoes of a conventional drum type braking system.

In FIG. 2, conventional brake drum 10 is shown in section with rim 23 surrounding the drum open end 18 having labrynth groove 24. When drum 10 is mounted to the associated vehicle, brake backing plate 26 is positioned such that its up-standing flange 28 is positioned within labrynth groove 24. Since brake drum 10 rotates whereas backing plate 26 is stationary it is important to prevent direct contact between these two components. For that reason, labrynth groove 24 must be formed with precision.

FIG. 2 shows the configuration of a conventional brake drum both in its "as-cast" condition, and after finish machining. The as-cast configuration is designated by the outline of phantom line 30. In finish machining, it is necessary to machine away the material between phantom line 30 and the surface shown in full lines of the finished drum. It is significant to note that a large volume of material must be removed in the area defining labrynth groove 24. Although it might seem appropriate to design the casting mold to create a core area in the region of the groove to reduce machining requirements, it has been found that more precise machining is possible when cutting into a solid block of material.

Now with reference to FIGS. 3 and 4, a composite brake drum in accordance with the present invention is shown and is generally designated by reference number 36. As is shown, brake drum 36 has overall physical features which are virtually identical to those described in connection with conventional brake drum 10. These common features are designated by the same reference numbers used previously.

Figure 5:
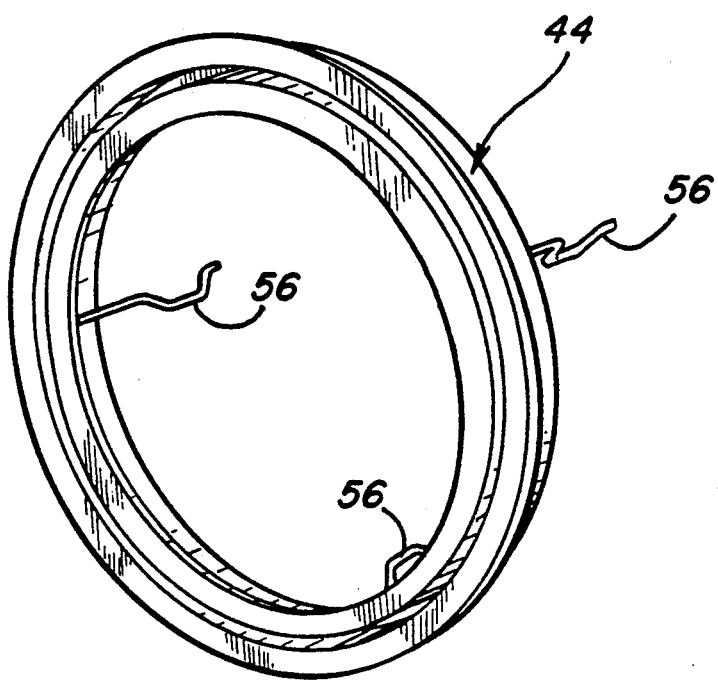
FIG. 5 is a pictorial view of the ring insert of this invention.

As shown in FIG. 3, brake drum 36 is formed within casting cavity 38 formed between male mold 40 and female mold 42. Before cast iron is poured into casting cavity 38, ring insert 44 shown in FIG. 5 is placed within the cavity. Ring 44 has a "hat" or letter "U" section configuration having a radial wall 46 (with respect to axis 14) joining a pair of cylindrical walls 48 and 50, thus defining an open channel around drum rim 23. Ring 44 further has a pair of flanges 52 and 54 extending radially outward and inward from cylindrical walls 48 and 50, respectively. Flanges 52 and 54 aid in controlling the position of ring 44 when it is placed within casting cavity 38 since they define a broad base surface which the ring rests on within the casting cavity. Flanges 52 and 54 further act as walls or drums to control the flow of molded iron during casting. Ring 44 is preferably made from sheet steel stock formed by stamping or roll-forming.

Positioning of ring 44 is facilitated by the upstanding wall 55 of male mold 40 which fills the labrynth groove area. To further assure accurate positioning of ring 44 within casting cavity 38, two or more locating wires 56 can be provided. Locating wires 56 are attached to ring 44 for example, by welding, and extend to contact one or both of the molds 40 or 42. As shown in FIGS. 3 and 4, locating wires 56 have a segment 58 which extends along male mold surface 40. By spreading out the contact in this manner, the likelihood of scraping sand away from the mold is reduced. When used, three or more locating wires 56 would be provided and positioned circumferentially around ring 44.

FIG. 4 shows composite brake drum 36 after final machining. The "as-cast" configuration of brake drum 36 is shown in FIG. 4 by the outline of phantom line 60 whereas the final machined configuration is shown by the full line configuration in FIG. 4. As shown, inside braking surface 22 is machined away which results in portions of locating wires 56 being removed. In addition, portions of ring 44 are also machined away around drum open end rim 23. However, all three surfaces of labrynth groove 24, including the bottom 62 and sides 64 and 66 of the groove are defined by ring 44, thus providing an accurately formed labrynth groove which requires a minimal degree of post-casting machining.

As mentioned elsewhere in this description, the presence of ring 44 provides the additional benefit of providing for enhanced mechanical characteristics of brake drum 36. The location of ring 44 around brake drum rim 23 is especially advantageous in that this is the region of the brake drum normally experiencing the greatest level of strain during use. In drum brake operation a phenomenon referred to as brake drum "belling" occurs in which the open end enlarges in diameter relative to the remainder of the drum. This deflection has been known to cause cracks in the brake drum which eventually can lead to the need for brake drum replacement. The presence of annular ring 44, when made of a high modulus material such as steel aids in reducing drum deflection and in stopping cracks from prorogating along brake drum side portion 16 toward mounting disk portion 12. It is further conceivable that the strengthening effect of ring 44 could lead to an optimized structure of less weight than present brake drums for a particular application.

While the above description constitutes the preferred embodiments of the present invention, it will be appreciated that the invention is susceptible of modification, variation and change without departing from the proper scope and fair meaning of the accompanying claims.

I claim:

1. A brake drum for a motor vehicle comprising:
  a center disk portion for mounting said drum to said motor vehicle,
  a cylindrical side portion joining said center disk portion to define an inside cylindrical braking surface and a closed end and an open end surrounded by a rim, and
  an annular ring insert having a radial wall and first and second cylindrical walls joining said radial wall, said ring imbedded within said cylindrical side portion to form a bottom and side surface of a labrynth groove within said rim facing said open end.

2. A brake drum for a motor vehicle according to claim 1 wherein said annular ring insert is formed from sheet metal.

3. A brake drum for a motor vehicle according to claim 1 wherein said brake drum center disk portion and cylindrical side portion are formed from cast iron.

4. A brake drum for a motor vehicle according to claim 1 wherein said annular ring insert further comprises locating means for positioning said annular ring relative to said cylindrical side portion during forming of said brake drum.

5. A brake drum for a motor vehicle according to claim 4 wherein said locating means comprises at least two legs affixed to said annular ring.

6. A brake drum for a motor vehicle according to claim 1 wherein said labrinth groove opens in a lateral direction relative to the axis of rotation of said brake drum.

7. An insert for incorporation into a brake drum of the type having a center disk portion for mounting said drum to a motor vehicle and having a cylindrical side portion joining said center disk portion to define an inside cylindrical braking surface and a closed end and an open end surrounded by a rim, said insert comprising:
  an annular ring having a radial wall and first and second cylindrical walls joining said radial wall, said walls having a generally constant thickness being formed from a deformable sheet stock material.

8. An insert according to claim 7 further comprising locating means for positioning said annular ring relative to said cylindrical side portion during forming of said brake drum.

9. An insert according to claim 8 wherein said locating means comprises at least two legs affixed to said annular ring.

10. An insert according to claim 7 wherein said annular ring is formed from sheet steel.

11. An insert according to claim 7 wherein said annular ring further defines a flange extending from at least one of said cylindrical walls.

12. An insert according to claim 11 wherein said annular ring defines a pair of flanges with one of said flanges extending from each of said cylindrical walls.

13. A brake drum for a motor vehicle made by a process comprising the steps of:
  providing casting mold halves defining a mold cavity for forming said brake drum defining a center disk portion for mounting said drum to said motor vehicle and a cylindrical side portion joining said center disk portion to define an inside cylindrical braking surface, said cylindrical side portion joining said center disk portion to define a closed end and further having an open end surrounded by a rim, providing an insert in the form of an annular ring having a radial wall and first and second cylindrical walls joining said radial wall, placing said insert into said mold cavity in a position for at least partially defining said rim such that said insert walls define the bottom and side surfaces of a labrynth groove opening laterally relative to said drum, pouring molten iron into said mold cavity thereby imbedding said insert and forming said brake drum, and removing said brake drum from said mold cavity.

14. A brake drum made by the process according to claim 13 further comprising the step of machining said brake drum after said removing step thereby machining away portions of said insert.

15. A brake drum made by the process according to claim 13 further comprising the step of providing said insert having walls having a generally constant thickness being formed from a deformable sheet stock material.

* * * * *